May 16, 1944.  G. E. STILWELL ET AL  2,349,205
MACHINE FOR MANUFACTURING LIDS FOR MULTIPLE BOXES
Filed April 3, 1940  5 Sheets-Sheet 1
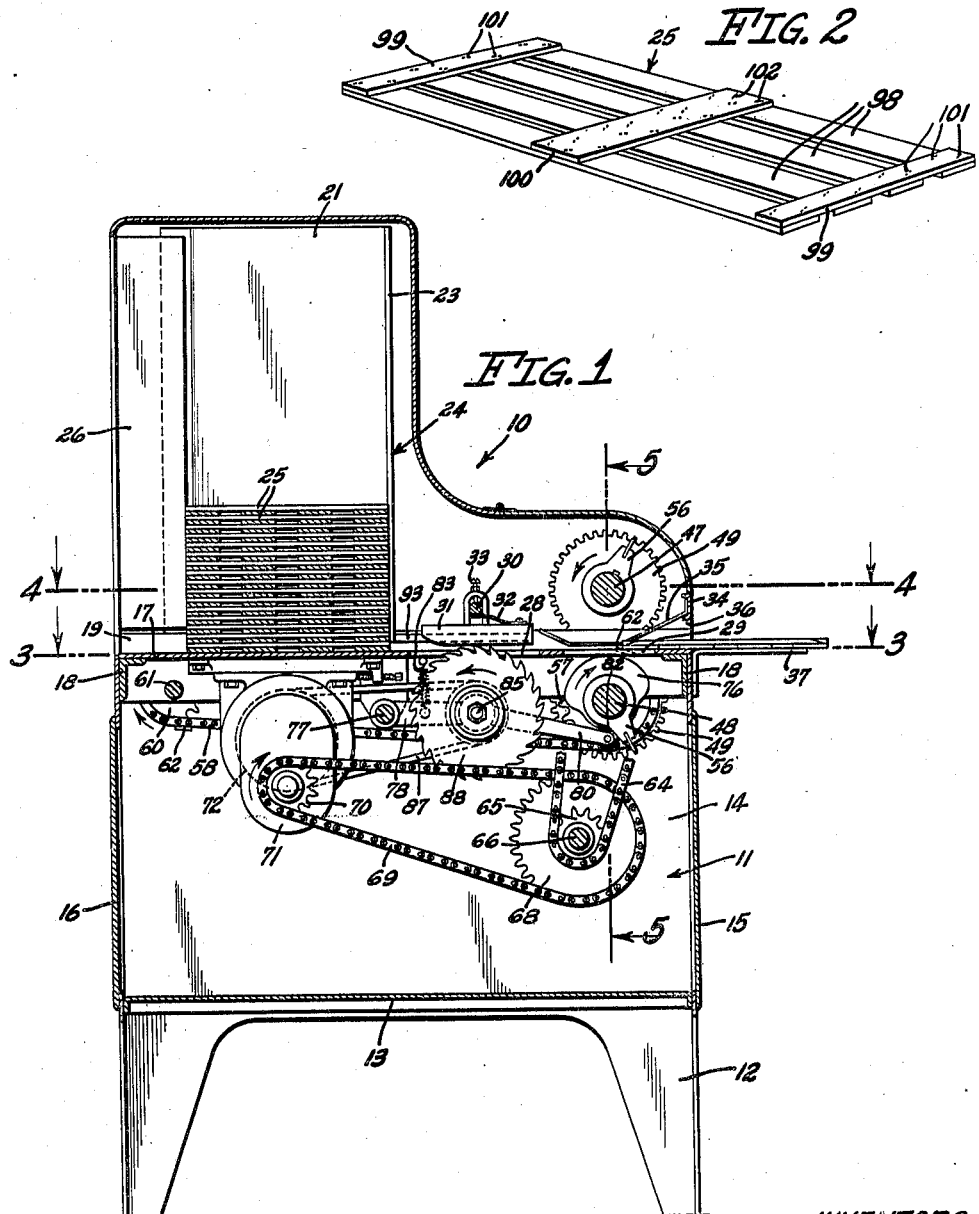
INVENTORS:
GLENN E. STILWELL
GERALD C. PAXTON
BY
ATTORNEY May 16, 1944.  G. E. STILWELL ET AL  2,349,205
MACHINE FOR MANUFACTURING LIDS FOR MULTIPLE BOXES
Filed April 3, 1940  5 Sheets-Sheet 2
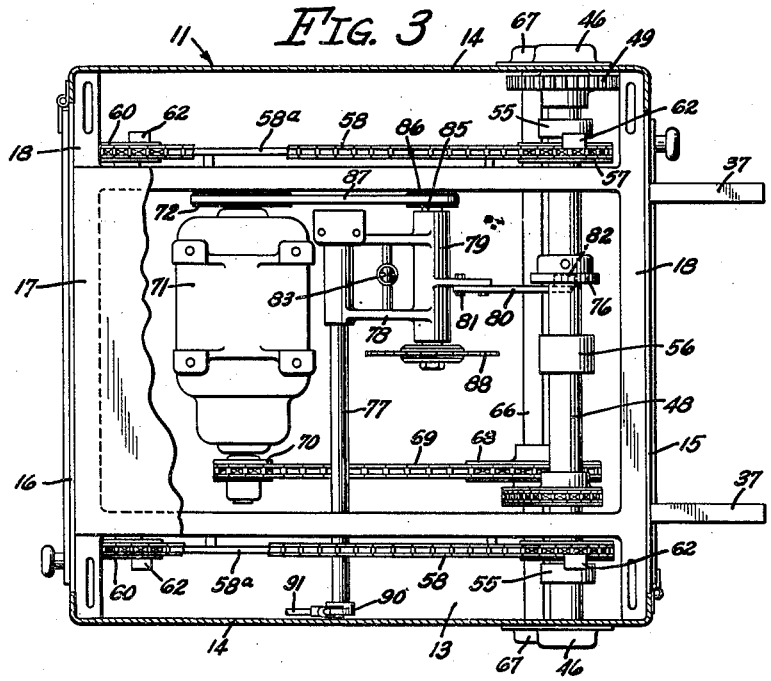
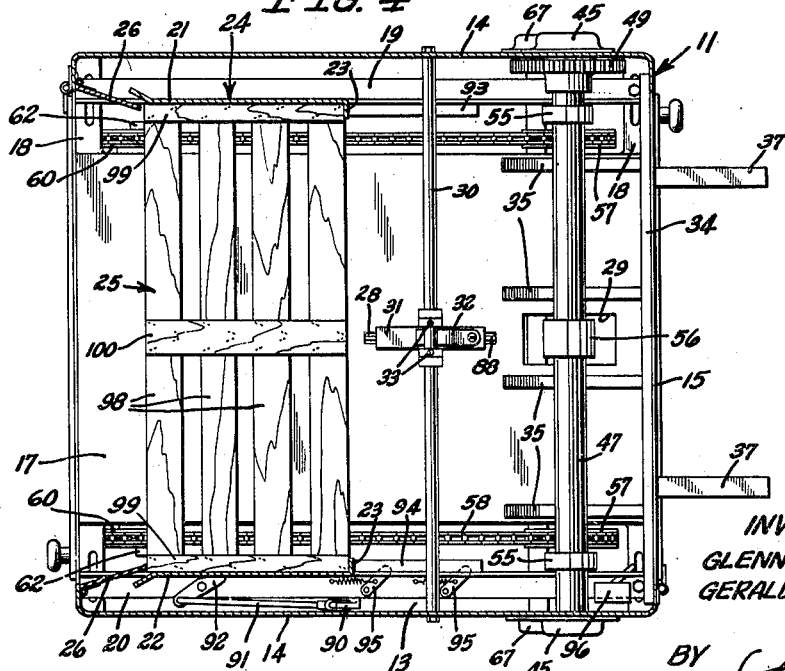
INVENTORS:
GLENN E. STILWELL
GERALD C. PAXTON
BY
ATTORNEY

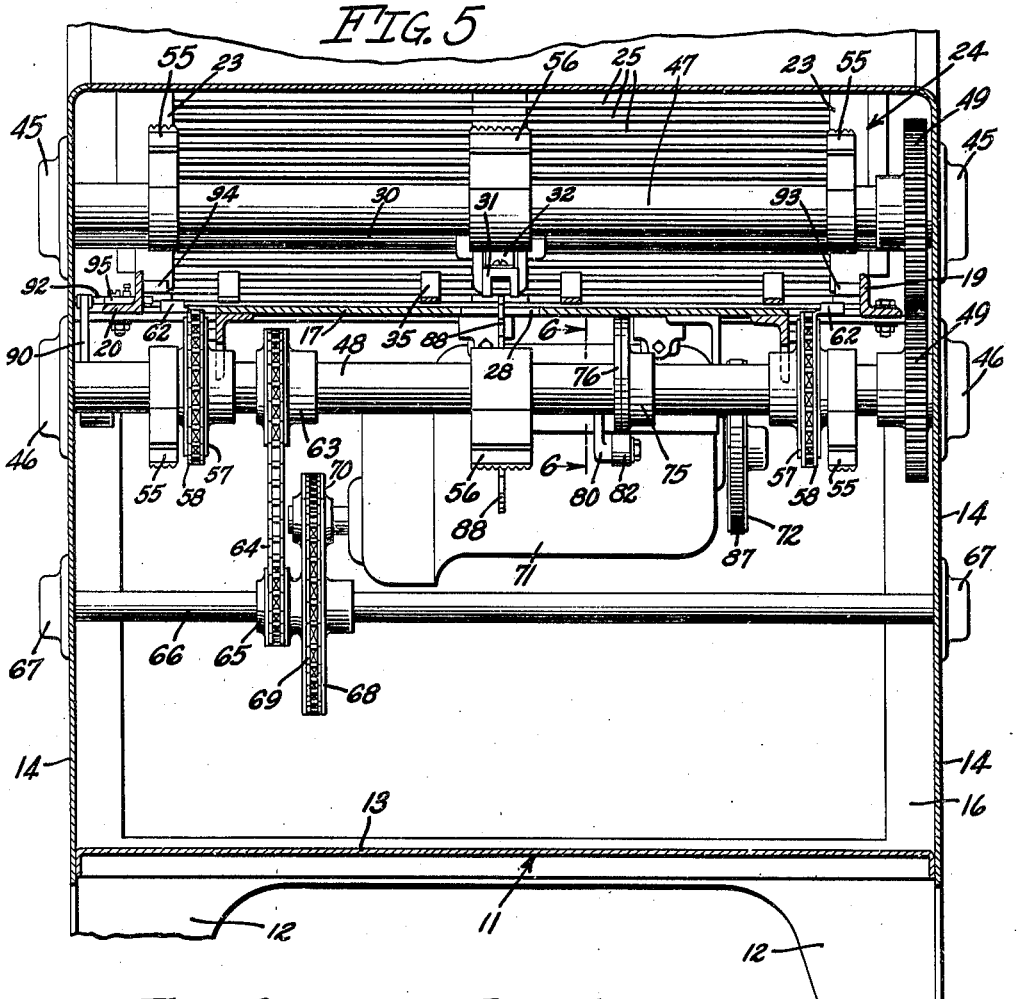
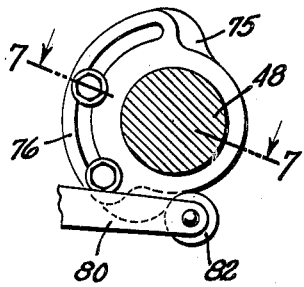
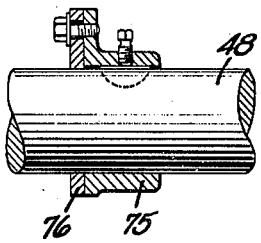

May 16, 1944.    G. E. STILWELL ET AL    2,349,205
MACHINE FOR MANUFACTURING LIDS FOR MULTIPLE BOXES
Filed April 3, 1940    5 Sheets-Sheet 4

INVENTORS:
GLENN E. STILWELL
GERALD C. PAXTON

BY
ATTORNEY

May 16, 1944.   G. E. STILWELL ET AL   2,349,205
MACHINE FOR MANUFACTURING LIDS FOR MULTIPLE BOXES
Filed April 3, 1940   5 Sheets-Sheet 5
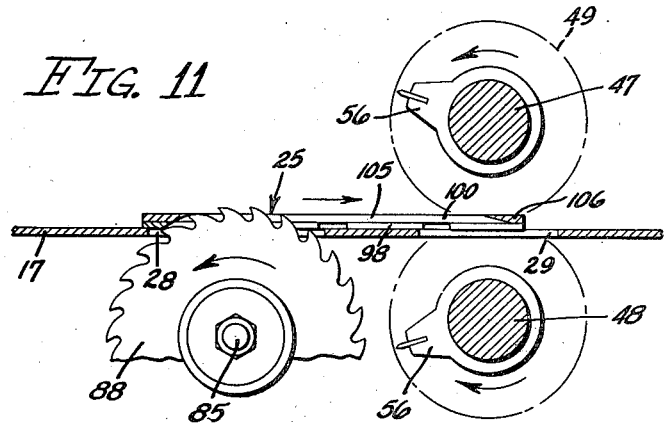
FIG. 11
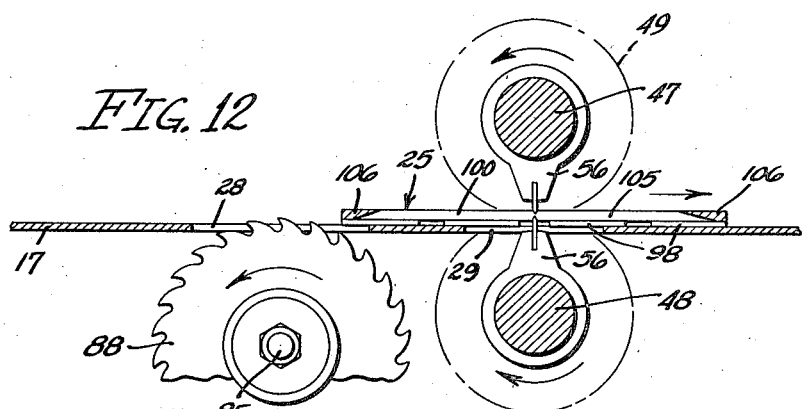
FIG. 12
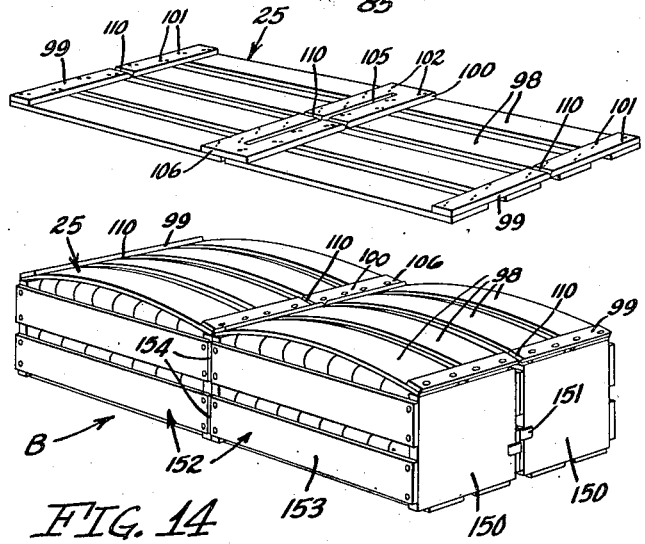
FIG. 13
FIG. 14
INVENTORS:
GLENN E. STILWELL
GERALD C. PAXTON
ATTORNEY Patented May 16, 1944

UNITED STATES PATENT OFFICE 2,349,205

2,349,205
MACHINE FOR MANUFACTURING LIDS FOR MULTIPLE BOXES

Glenn E. Stilwell and Gerald C. Paxton, Riverside, Calif., assignors to Food Machinery Corporation, San Jose, Calif., a corporation of Delaware Application April 3, 1940, Serial No. 327,530

1 Claim. (Cl. 144—2)

This invention relates to the art of lid manufacturing and is particularly useful in producing lids adapted for lidding multiple boxes.

Such lids are preferably unitary so as to cover all the individual unit containers of a multiple box with a single lidding operation, but must be weakened along the lines dividing said containers so that when said boxes are disassembled into their respective containers the lid is readily divided up into portions each of which provides an applied cover for one of said unit containers.

It is an object of this invention to provide a novel machine for manufacturing said lids.

The lids aforesaid are relatively fragile when manufactured and are not adapted to be handled much prior to their being used in the lidding of a multiple box.

It is another object of this invention to provide such a machine for manufacturing lids for multiple boxes by which said lids may be produced readily as they are used in the lidding of such boxes.

The manner of accomplishing the foregoing objects as well as further objects and advantages will be taken in connection with the accompanying drawings, in which:

Fig. 1 is a cross-sectional view of a preferred embodiment of the machine of this invention.

Fig. 2 is a perspective view of a lid blank as it appears when inserted into the aforesaid machine.

Fig. 3 is a horizontal sectional view taken on the line 3—3 of Fig. 1.

Fig. 4 is a horizontal sectional view taken on the line 4—4 of Fig. 1.

Fig. 5 is an enlarged vertical sectional view taken on the line 5—5 of Fig. 1.

Fig. 6 is an enlarged detail sectional view taken on the line 6—6 of Fig. 5 and illustrating the adjustable saw control cam.

Fig. 7 is a detail cross-sectional view taken on the line 7—7 of Fig. 6.

Figs. 8 to 12 are enlarged, diagrammatic sectional views showing the following steps of operation of the machine:

Fig. 8 shows a lid being conveyed toward the saw;

Fig. 9 shows the saw cutting the first slat of the lid without cutting the cleat;

Fig. 10 illustrates the saw just as it is raised to cut through the cleat;

Fig. 11 shows the relative positions of the saw and lid just before the saw is lowered below the level of the cleat; and Fig. 12 shows the final step in the cycle of operation in which the last slat is severed and the cleats are pinched.

Fig. 13 is a perspective view similar to Fig. 2 but showing the lid as it appears after being operated on by the machine of this invention.

Fig. 14 is a perspective view illustrating the lid produced by the machine of our invention as this appears when applied to a multiple box.

Figure 8:
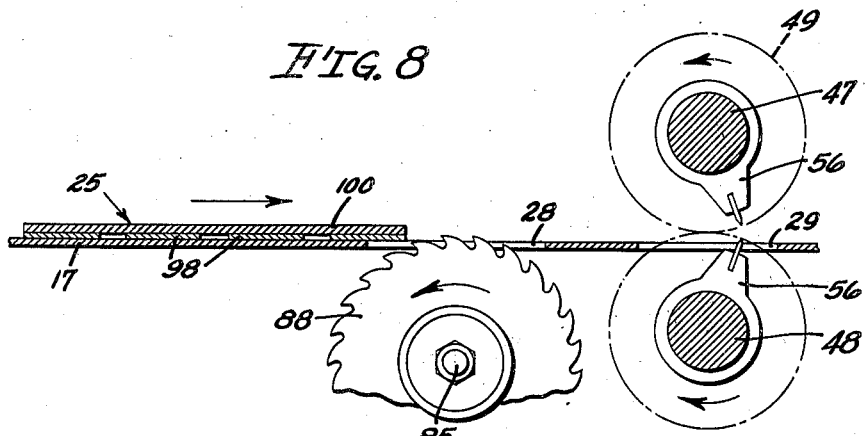

The preferred embodiment of our invention illustrated in the drawings, comprises a machine 10 having a housing 11 which is supported on legs 12. The housing 11 has a lower floor 13, side walls 14, front and rear doors 15 and 16, and an operating floor 17.

As shown in Fig. 4, the floor 17 does not extend entirely across the housing 11 and is supported at its opposite ends on angle irons 18, the latter being fixed to the front and rear walls of the inner face of the housing 11. Fixed to the angle irons 18 and supported thereon for lateral adjustment, are angle irons 19 and 20, these angle irons supporting lid magazine side walls 21 and 22 having forward stop flanges 23. The floor 17 and walls 21 and 22 unite to form a lid magazine 24. The rear of the machine 10 is open for the introduction of blank lids 25 into the magazine 24 and spring-hinged side gates 26 yield to permit the insertion of such lids into the magazine and then spring inwardly to prevent the accidental removal of such lids. Provided in the floor 17 for a purpose to be made clear hereinafter, are holes 28 and 29.

Extending across the housing 11 above the floor 17 and with its opposite ends secured by cap screws to the walls 14 is a shaft 30 (see Figs. 1 and 4) having suspended thereon a lid-depressing shoe 31 which is spring-pressed downwardly by a leaf spring 32, the vertical position of this shoe being adjustable by screws 33. The bottom face of the shoe 31 is hollowed out longitudinally thereof, for a purpose which will be made clear hereinafter.

Extending from one side of the housing 11 to the other across the front end thereof, just above the floor 17, is a channel member 34 upon which is mounted a series of leaf springs 35 which extend rearwardly parallel to the floor, and then upwardly for the purpose of guiding a lid travelling over said floor. Formed in the housing 11 beneath the channel iron 34 is a lid discharge mouth 36, the housing having lid-supporting arms 37 extending outwardly therefrom just beneath said mouth.

Journalled in suitable bearings 45 and 46 mounted on the housing side walls 14 (see Figs. 1 and 5) are heavy shafts 47 and 48, these shafts having fixed thereto gears 49 which mesh to cause the shafts 47 and 48 to rotate at all times, synchronously in opposite directions at a 1-to-1 ratio.

Fixed on the shafts 47 and 48 are end pincer jaws 55 and central pincer jaws 56, these jaws being so arranged as to come into directly opposite pinching relation in pairs for a purpose which will be made clear hereinafter. When the jaws 56 thus come into pinching relation the lower jaw 56 extends upwardly through the hole 39 in the floor 17.

Fixed on the shaft 48 are sprockets 57. Chains 58 are trained around these sprockets and sprockets 60 which idle on a shaft 61 at the rear of the machine so that the upper flights of chains 58 travel on tracks 58a (as seen in Fig. 3) to maintain these flights on the same level as that of the floor 17. These chains are provided with lid feeding lugs 62.

Also fixed on the shaft 48 is a jack chain sprocket 63, a chain 64 being trained about this sprocket and about a jack pinion sprocket 65 mounted on a jack shaft 66, the latter being journalled in bearings 67 on the housing walls 14. The pinion sprocket 65 is formed integral with a sprocket 68 which is connected by an endless chain 69 to the drive pinion 70 of a motor 71, this being mounted on the bottom face of the floor 17. This motor embodies suitable gear mechanism which causes the pinion 70 to rotate at a relatively slow rate. The motor 71 has a high speed drive pulley 72 at its opposite end.

Also fixed on the shaft 48, as seen in Figs. 6 and 7, is a cam base 75 having a cam 76 adjustably fixed on said base, the purpose of this cam being made clear hereinafter.

Suitably journalled in bearings provided on the floor 17, as shown in Fig. 3, is a shaft 77 having fixed thereon an arm structure 78 carrying a bearing 79 on which a cam arm 80 is adjustably mounted by bolts 81, said arm carrying a cam following roller 82. Connected at one end to the structure and at its other end to the floor 17 is a contractile spring 83 which continually urges the structure 78 upwardly so as to bring the cam following roller 82 into contact with the adjustable cam 76.

Journalled in the bearing 79 is a shaft 85 having a pulley 86 at one end thereof which is in alignment with the motor pulley 72 and connected to this by a belt 87. On the other end of the shaft 85 is mounted a disc saw 88, this saw being disposed just below the opening 28 in the floor 17 and the hollowed shoe 31.

Fixed on an end of the shaft 77 is an arm 90, the upper end of this arm being connected by a link 91 (see Fig. 4) to a flushing lever 92 which is disposed opposite a suitable opening provided in the magazine side 22 so that when said shaft 77 is rotated to depress the disc saw 88 the lever 92 will be swung to flush the lowermost lid 25 in the magazine 24 against the opposite wall 21 thereof.

Fixed upon the angle irons 19 and 20 and extending inwardly therefrom, as shown in Figs. 4 and 5, are guides 93 and 94, each being disposed at such a level as to hold down the ends of any lids 25 fed forwardly from the magazine 24. Spring-pressed guide arms 95 are provided on the angle iron 20 so as to extend through apertures therein beneath the guide ledge 94 to assist in holding lids 25, which may be fed from the bottom of the magazine 24, against the angle iron 19 at the opposite side of the machine.

Mounted on the angle iron 20 adjacent the discharge mouth 36 of the machine (see Fig. 4) is a limit switch 96 having an arm which extends into the path of lids fed through the machine 10; the purpose of this switch being made clear hereinafter.

*Operation*

The preferred manner of using the machine 10 is to place this near a lidding machine where multiple boxes are to be lidded. A supply of lids 25 is of course kept in the magazine 24 at all times, these lids comprising a series of four slats 98, two end cleats 99 and a central cleat 100. The cleats 99 are secured to the slats 98 as by staples or nails 101, while the cleat 100 is secured to the slats 98 by two spaced rows of staples or nails 102.

When the motor 71 is energized, the disc saw 88 is rotated at a high speed, this saw now being disposed as shown in Fig. 1. In following the sequence of operations of the machine 10, it is necessary to bear in mind that the shafts 47 and 48 rotate twice for each slat processing cycle. This is how it happens that the machine is started and stopped with the saw 88 in its upward position. As the motor starts, the shafts 47 and 48 also start to rotate, this causing the dogs 62 to start feeding a lid 25 from the lower end of the magazine 24 forwardly across the floor 17. Fig. 8 illustrates the relation of the disc saw 88, the pincer jaws 56, and the lid 25, as the latter is fed out by the operation of the machine to where this lid starts to come in contact with the saw 88. Here it is seen that the saw has been lowered by the high portion of cam 76 rotating into position over the roller 82.

Figure 9:
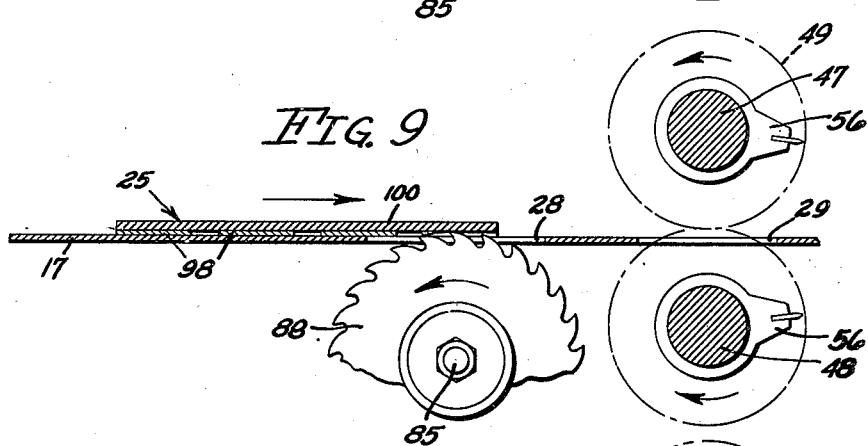
Figure 10:
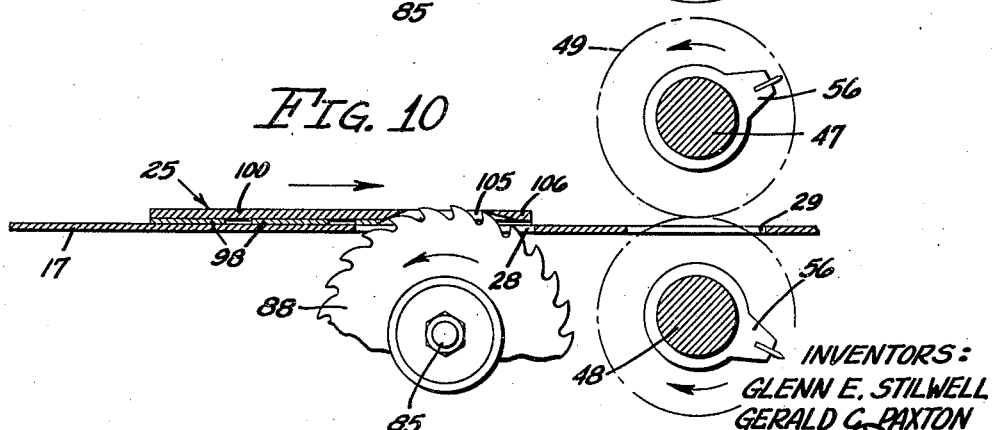

Fig. 9 illustrates the manner in which the first contact between the lid and the saw causes the latter to cut upwardly into the lid just far enough to cut in two the foremost slat 98 of the lid. As the feeding of the lid 25 progresses, however, and the shafts 47 and 48 continue to rotate, the high portion of the cam 76 passes from over the roller 82 allowing the spring 83 to lift the saw 88 upwardly so that the rotation of this saw, as the lid continues to advance, not only cuts through the slats 98 but also through the central cleat 100 disposed thereover, as shown in Fig. 10.

The cam 76 allows the saw 88 to be thus springheld in its upwardmost position until the lid being fed through the machine has progressed to the position in which it is shown in Fig. 11. Here the high portion of the cam 76 again depresses the roller 82 and the saw disc 88 to its original downward position. This action of the saw 88 results in the complete severing of all the slats 98 at the center of the lid 25 and the production of a slot 105 in the cleat 100 along the axis of the latter, leaving bridges holding together opposite end portions of the lid 25 until the operator of the lidding machine is able to place the lid as an entity in the lidding machine and operate the latter to lid a multiple box therein.

As the lid 25 passes from contact with the saw 88, the pincer jaws 55 and 56 rotate with the shafts 47 and 48 until they come into juxtaposed relation as shown in Fig. 12. The travel of the lid 25 is so timed with the location of these jaws on the shafts 47 and 48 that these jaws come together for the second time during the current cycle just when they are opposite the central longitudinal axis of the lid 25. The jaws 55 are fixed so as to thus operate in the zone of the end cleats 99 while the jaws 56 are located to operate in the zone of the central cleat 100. As these jaws come close together, therefore, as shown in Fig. 12, they pinch these cleats along the longitudinal central axis of the lid, thereby weakening these cleats and the entire lid along this axis. Thus, when the lid 25 is discharged through the mouth 36 onto the arms 37 as shown in Fig. 1, this lid appears as shown in Fig. 13. In addition to the slats 98 being severed in the middle of the lid and the cleat 100 having a slot 105 formed therein, the cleats 99 and 100 have scorings 110 formed in their top and bottom faces along the longitudinal axis of the lid. The lid is thus in condition to be placed in a lidding machine for lidding a multiple box having four separate container units, and nailed to that box. In the lidding operation, where the container units are filled with high packs of fruit and the like, the portions of the slats 98 between the middle cleat 100 and the end cleats 99 are arched upwardly and the ends of the lid 25, as well as the middle edges thereof, are pressed downwardly against the opposite ends of the container units in the multiple box.

To complete the lidding operation, nails are driven downwardly through the ends of the lid 25 and through the portions of the cleat 100 on opposite sides of the slot 105 into the container unit ends. This arching of the slats 98 and the pressing downwardly of the cleats in the lidding operation tends to split the unsevered portions 106 of the central cleat 100 so that when proper time comes for disassembling the container units of the multiple box, the lid 25 can be readily broken up into four separate lids which remain nailed to the individual container units of the multiple box after these units are separated from each other.

The flushing of the lowermost lid 25 against the angle iron 19 by the flushing lever 92 and spring-pressed arms 95 insures proper alignment of each lid with the saw 88 and the pincer jaws 55 and 56 so as to cause the sawing and pinching of this slat to take place symmetrically with respect to the lid.

The switch 96 is a limit switch which controls the electric circuit to the motor 71. The arm thereof extends into the path of lids being processed in the machine 10 so that when such a lid engages the switch arm it shuts off the motor 71. There being no brake on the mechanism of this machine, it coasts after the motor is shut off so as to complete the processing of the lid which shuts off the motor until this lid has been completely processed and is fed out onto the supports 37 as shown in Fig. 1.

When stopping in this position, a lid 25 still holds the switch 96 off so that the machine 10 remains idle until the lidder operator is ready for another lid. Upon the operator's removing a processed lid 25 from the mouth 36 of the machine 10, the switch 96 is released from the pressure of this lid and it starts the motor 71 to cause the automatic processing of another lid by this machine and its delivery therefrom in the same manner as heretofore described ready for use.

By way of illustrating the mode of use of the lids 25, a multiple box B is illustrated in Fig. 14 after this box has been over-filled with fruit and then lidded with one of the lids 25. This multiple box includes two separate longitudinal sections 150 which are temporarily bound together by clasps 151 before being packed. Each of the sections 150 has two units 152, each of the latter comprising a complete box in itself, the two units 152 and each of the sections 150 being held together by having common side slats 153. These side slats are scored at 154 so that when each of the sections 150 are separated from each other the separation of the units 152 of each section may be completed by rotating these relative to each other about the axis of the scoring 154. The only slats thus used to bind together the two units of each section are the outer side slats. The bottom slats and inner side slats are both completely severed in the plane at which the units 152 meet.

After a lid 25 has been manufactured by the machine of our invention, it is fed into a suitable lidding machine in which means is provided for pressing the lid downwardly against the upper layer of the fruit packed in the box B so that the lid is bent in the middle as shown in Fig. 14 and each end portion of the lid arches upwardly over the compressed fruit. Nails are then driven by the lidding machine through end portions of the lid 25 into the outer ends of the units 152 and through the portions of the middle cleat 100 of the lid on opposite sides of the slot 105 into the respective inner ends of the box units 152.

The lid 25 thus makes possible the disassembly of the multiple box B into its respective units 152 without the use of other tools than a screw-driver for removing the clasps 151. The box B is normally intended to remain in the form in which it is shown in Fig. 14 until it reaches the retailer. Here the clasps 151 are removed, after which the sections 150 are rocked about the axis of the scorings 110 which causes the cleats 99 and 100 to break cleanly along the lines of these scorings, thus causing the sections 150 of the multiple box B to be completely separated. The separation of the units 152 from each other may now be accomplished by rocking the units of each section 150 about the line of scorings 154 of their connecting outer side slats 153. As the unsawed portions 106 of the middle cleat 100 were broken in the bending of the cleat 100 along its central axis as shown in Fig. 14, the lid 25 is entirely divided into 4 separate lids, one for each of the units 152, by the complete separation of the sections 150 as above described. The lid 25 accordingly offers no resistance to the separation of the units in the sections after the latter have been separated from each other. Upon the final disassembly of the box B each of the units 152 is seen to be left with a complete lid comprising one-quarter of the lid 25.

We claim as our invention:

In a machine for treating unitary lids to weaken the same both longitudinally and transversely to prepare said lids for application to multiple boxes, the combination of: magazine means for receiving a store of blank lids, each of such lids having slats joined together by end cleats and a central cleat; means for feeding said lids one at a time from said magazine means along a given path and expelling said lids from said machine; means operating in timed relation with said feed means for weakening each such lid along its longitudinal axis and its lateral axis as said lid moves between said magazine and the point of discharge thereof from said machine; and control means engaged by said lid to stop said machine when said lid has been so processed, said control means starting said machine when said lid is removed.

GLENN E. STILWELL.
GERALD C. PAXTON.